United States Patent [19]

Ferdows

[11] Patent Number: 5,066,067
[45] Date of Patent: Nov. 19, 1991

[54] PREFABRICATED BUS HOUSING

[75] Inventor: Houshang Ferdows, Boulder, Colo.

[73] Assignee: Relco, Inc., Lamar, Colo.

[21] Appl. No.: 408,724

[22] Filed: Sep. 18, 1989

[51] Int. Cl.$^5$ ............................................. B62D 25/00
[52] U.S. Cl. .................................. 296/197; 296/204; 296/210; 98/2.15
[58] Field of Search ............... 296/196, 197, 178, 900, 296/901, 191, 208, 210, 204, 156, 164; 98/2.15; 62/244

[56] References Cited

U.S. PATENT DOCUMENTS

| | | |
|---|---|---|
| 1,464,989 | 8/1923 | Herreshoff ............................ 296/178 |
| 1,675,074 | 6/1928 | Wiener ................................ 296/178 |
| 2,730,772 | 1/1956 | Jones ................................ 296/901 X |
| 3,003,810 | 10/1961 | Kloote et al. ...................... 296/901 X |
| 3,556,583 | 1/1971 | Ellard ............................... 296/191 |
| 3,811,721 | 5/1974 | Bolesky ............................ 296/901 X |
| 3,815,307 | 6/1974 | Tantlinger ........................ 296/178 X |
| 4,134,275 | 1/1979 | Erickson et al. ..................... 62/244 |
| 4,221,426 | 9/1980 | Wardill ............................. 296/178 |
| 4,283,086 | 8/1981 | Morin .............................. 296/178 |
| 4,482,589 | 11/1984 | Widman ........................... 296/901 X |
| 4,491,362 | 1/1985 | Kennedy .......................... 296/901 X |
| 4,531,278 | 7/1985 | Boykin ............................ 296/197 X |
| 4,542,933 | 9/1985 | Bischoff .......................... 296/197 X |
| 4,732,011 | 3/1988 | Haiya ............................... 62/244 |
| 4,852,936 | 8/1989 | Greene et al. ...................... 296/178 |
| 4,917,435 | 4/1990 | Bonnett et al. .................. 296/197 X |

FOREIGN PATENT DOCUMENTS

| | | | |
|---|---|---|---|
| 1048875 | 8/1953 | France ............................ 296/196 |
| 4622 | 1/1983 | Japan ............................. 62/244 |
| 597966 | 2/1948 | United Kingdom ............... 296/196 |
| 1002674 | 8/1965 | United Kingdom ............... 296/191 |

*Primary Examiner*—Johnny D. Cherry
*Assistant Examiner*—Joseph D. Pape
*Attorney, Agent, or Firm*—John E. Reilly

[57] ABSTRACT

In a vehicle housing with a chassis and ground-engaging wheels suspended therefrom, the improvement of an elongated housing including modular front and rear sections, a top or roof section, and side sections on opposite sides of the housing, each section having inner and outer substantially rigid plastic skin members in closely spaced parallel relation to one another and a lightweight filler material between the skin members, beam members at spaced intervals to one another along the side sections, flanges interconnected along the adjoining peripheral edges of the sections, and a floor section rigidly mounted on top of the chassis with connecting members for rigidly attaching the front rear as well as side sections to outer peripheral edges of the floor section.

11 Claims, 3 Drawing Sheets

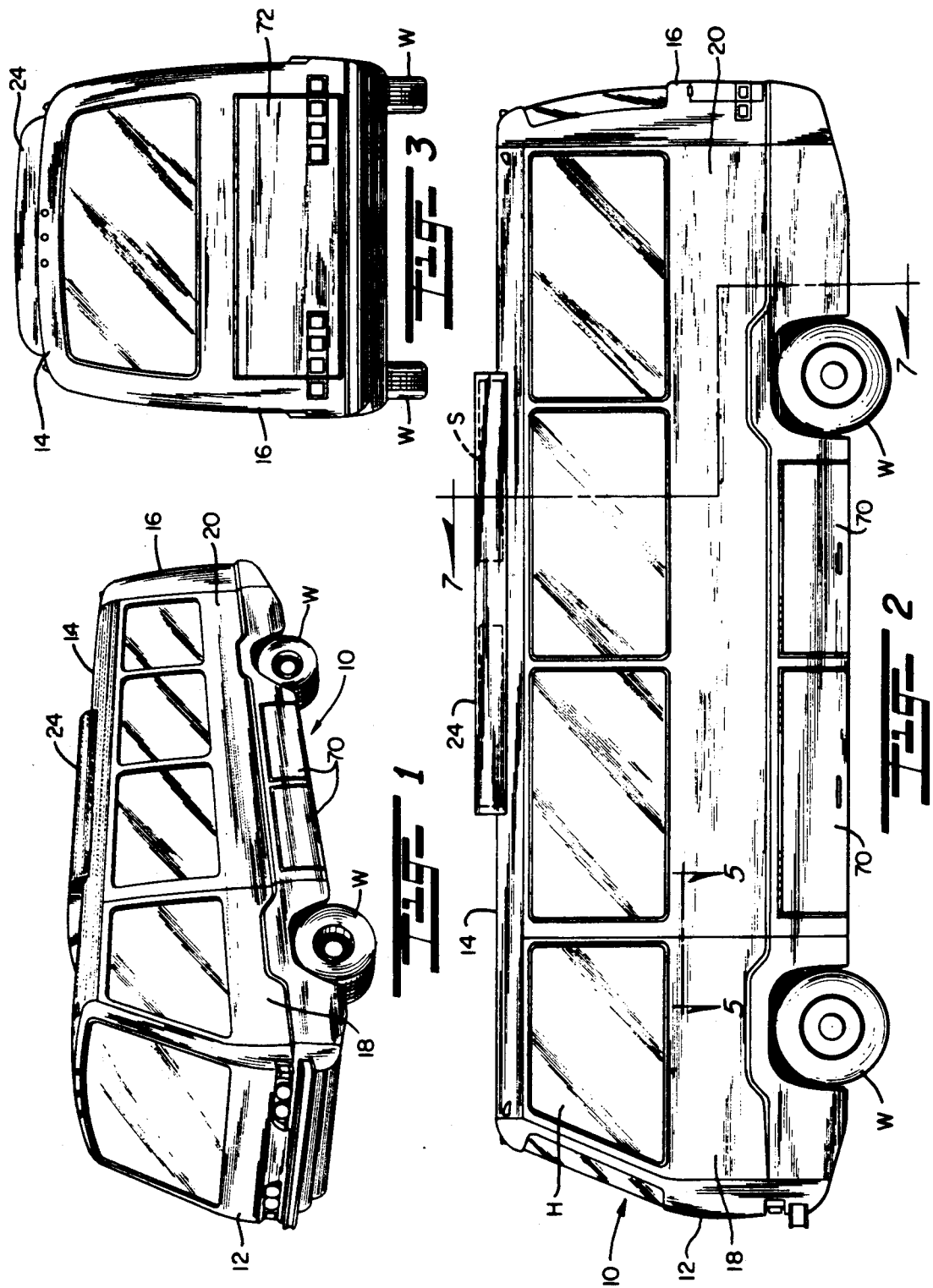

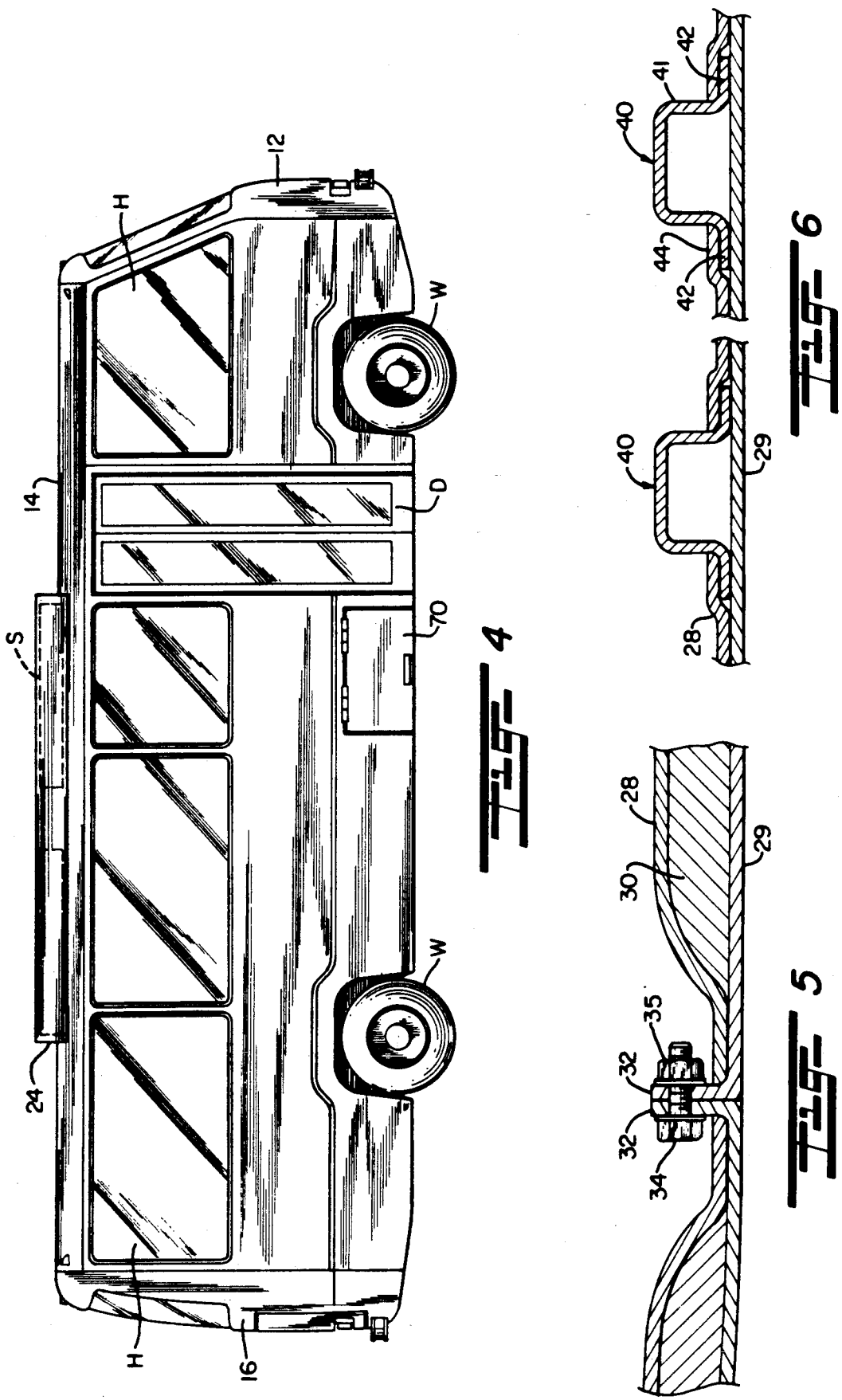

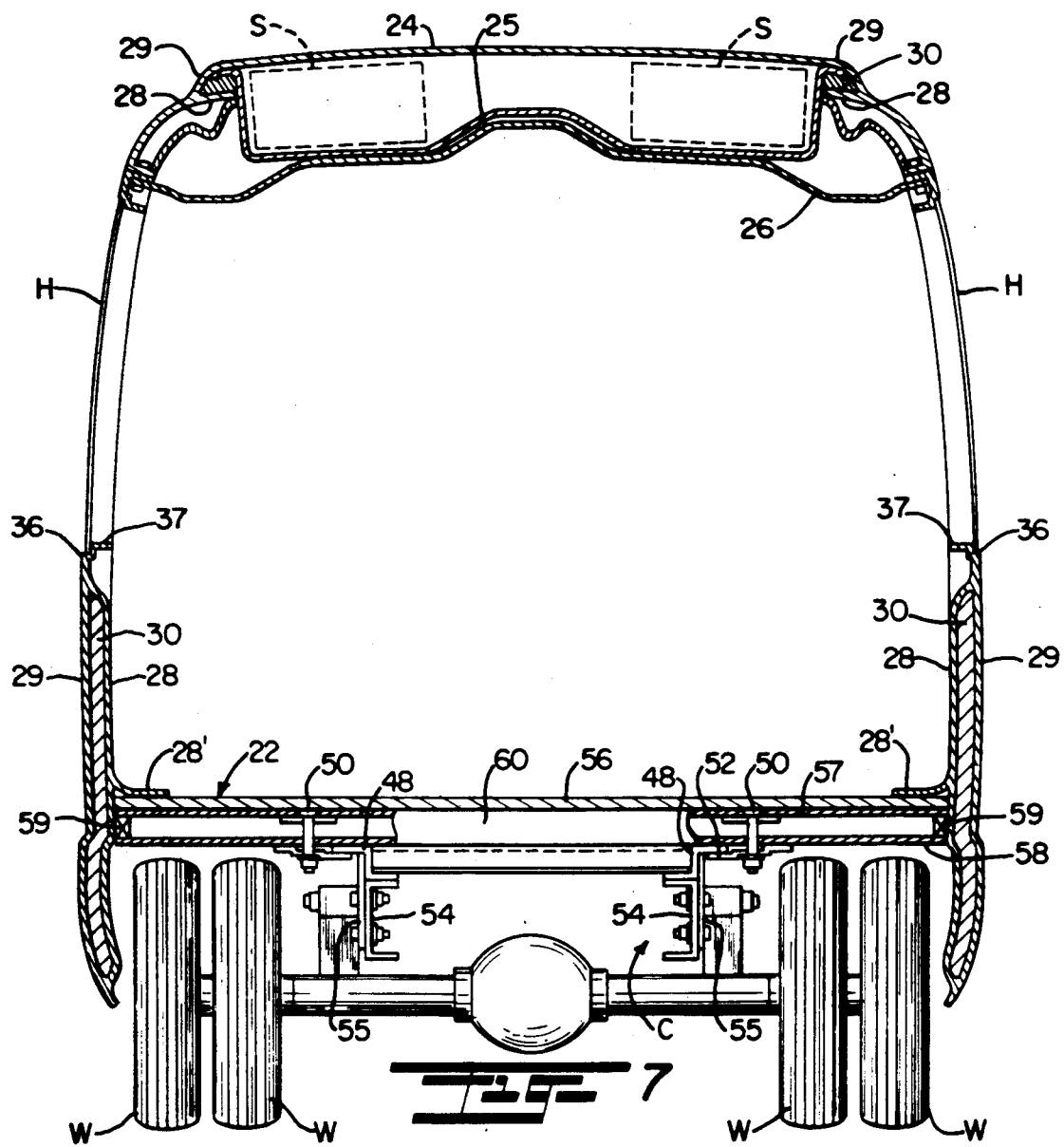

PREFABRICATED BUS HOUSING

This invention relates to a novel and improved vehicle housing; and more particularly relates to a novel and improved lightweight, prefabricated housing for public conveyances, such as, busses, mobile homes and other commercial transportation vehicles.

BACKGROUND AND FIELD OF THE INVENTION

It has been proposed to design and construct busses, mobile homes, campers and the like out of prefabricated modular sections either composed of metal frame members or lightweight plastic sections which can be interconnected by means, such as, welding or bolts into a unitary body. Customarily, these sections are united with a chassis or base frame which carries the necessary motive power source and ground-engaging wheels. Construction of housings in modular sections greatly reduces manufacturing and assembly costs and at the same time can result in a lightweight but high strength housing comparable to those which have been made in the past out of heavier metals. Representative of this approach is European Reference No. 10969/L/LU, dated 6 December, 1985, to C-P Rohr et al. In Rohr et al, the approach taken is to construct modular frames making up longitudinal segments of the roof, sidewalls, floor and chassis section, and to interconnect such modular frames in end-to-end relation and with front and rear end sections closing off opposite ends of the assembled frame. The walls of the individual modular frames are composed of inner and outer plastic shells filled with a foam core material and are equipped with the necessary supply lines and ducts for operation of the conveyance as a bus or other suitable commercial transportation vehicle. However, the modular frame construction as described presupposes that the bus is of uniform cross-section throughout and, for example, does not make provision for mounting of an air conditioning system substantially within the roof line of the housing.

Other patents of interest pertaining to roof-mounted air conditioning systems for motor vehicles and specifically of a low-profile variety for buses are those to Krug et al U.S. Pat. No. 4,201,064, Hammers et al U.S. Pat. No. No. 2,032,572 and Schjolin U.S. Pat. No. 2,784,568. However, none is directed to a prefabricated bus and specifically with a modular roof section for use in combination with a low-profile modular air conditioning unit; and further wherein modular sections can be united with a conventional chassis into a lightweight but high strength structure.

SUMMARY OF THE INVENTION

It is therefore an object to provide for a novel and improved prefabricated housing for busses, motor homes and the like.

Another object of the present invention is to provide for a novel and improved lightweight, prefabricated modular assembly of housing sections for busses and like vehicles which is inexpensive to fabricate and assemble into a lightweight, high strength rigid structure and is inexpensive to service and repair.

A further object of the present invention is to provide a prefabricated housing for busses and the like in which the housing sections are composed entirely of non-metallic lightweight plastic and wood materials and are readily conformable for use with conventional chassis structures.

An additional object of the present invention is to provide in a prefabricated housing assembly for a novel and improved modular roof section which is so constructed and designed as to facilitate its use in combination with low-profile, roof-mounted modular air conditioning systems.

In accordance with the present invention, there is provided in a preferred form of vehicle housing having a chassis and ground-engaging wheels suspended from the chassis, the improvement of an elongated housing including modular front and rear sections, a top section, and side sections on opposite sides of the housing, each section having inner and outer substantially rigid plastic skin members in closely spaced parallel relation to one another and a lightweight filler material between the skin members, beam members at spaced intervals to one another along the side sections, connecting flanges along the adjoining peripheral edges of the sections and means interconnecting the flanges together, and floor section rigidly mounted on top of the chassis with attaching means for rigidly attaching the front and rear as well as side sections to outer peripheral edges of the floor section. Preferably, the skin members are composed of one or more plies of fiberglass material and the beam members are of generally channel-shaped configuration with an open end of each beam in abutting relation to an inner surface of the side sections and means for securing the beam member to an inner surface of the side section. A modular roof section is recessed to accommodate a low profile air conditioning system.

The above and other objects, advantages and features of the present invention will become more readily appreciated and understood from the foregoing detailed description of a preferred embodiment when taken together with the accompanying drawings, in which:

BRIEF DESCRIPTION OF THE DRAWINGS

FIG. 1 is a perspective view of a preferred form of a prefabricated bus housing in accordance with the present invention;

FIG. 2 is a side view in elevation of the preferred form of bus housing illustrated in FIG. 1;

FIG. 3 is a rear end view of the preferred form of bus housing;

FIG. 4 is another side view in elevation of the opposite side of the bus housing to that shown in FIG. 2;

FIG. 5 is a cross-sectional view taken about lines 5—5 of FIG. 2;

FIG. 6 is a cross-sectional view of the beam construction employed in the modular sections of the preferred form of bus housing; and FIG. 7 is a cross-sectional view taken about lines 7—7 of FIG. 2.

DETAILED DESCRIPTION OF THE PREFERRED EMBODIMENT

Referring in more detail to the drawings, there is illustrated in FIGS. 1 to 7 a preferred form of prefabricated housing 10 for a motor vehicle wherein the housing 10 is mounted on a conventional chassis C having ground-engaging front and rear wheels W. The housing is comprised of prefabricated modular sections including a front section 12, roof section 14, rear section 16 and forward and rearward side sections 18 and 20, respectively. A floor section 22 serves to integrate the front and rear sections 12 and 16 along with the side sections 18 and 20 to the chassis, as shown in FIG. 7. In addition, the roof section 14 is recessed along an intermediate section of its length to accommodate an elongated removable compartment 25 for placement of a low profile modular air conditioning system as represented at S and which is covered by an upper convex skin member or cap 24.

Considering in more detail the construction and arrangement of the modular sections, each of the sections 10, 12, 14, 16, 18 and 20 is made up of inner and outer fiberglass skins 28 and 29, respectively, which are filled with an interior core 30, such as, a balsalm or other lightweight wood or plastic foam material. Preferably, the inner skin 28 is composed of a two-ply fiberglass material of uniform thickness throughout. The outer skin is composed of a three-ply fiberglass material, the skins 28 and 29 disposed in closely-spaced parallel relation to one another and joined directly together along peripheral edges, for example, where the sections are interconnected to one another or are interrupted by windows W or doors D, or are reinforced by means of beam members 40 in a manner to be described.

FIG. 5 illustrates the interconnection of the modular front and rear side sections 18 and 20 along one side of the bus wherein the outer skin 29 terminates in an inturned flange 32 at right angles to the skin. Bolt holes are located at vertically spaced intervals through the flange 32 to mate with corresponding openings in the abutting flange for insertion of bolts 34, and nuts 35 or other suitable fasteners are provided to tighten the flanges together.

Those edges of the front and rear sections 12 and 16 and side sections 18 and 20 which surround the windows H and door portion D, as shown in FIG. 7, are provided with insets 36 to receive the window or door, and a ledge 37 extends inwardly at right angles to the skin 29, as shown in FIG. 7.

As illustrated in FIG. 6, the beam members 40 are arranged at suitably spaced intervals along certain of the modular sections, such as, the front and rear side sections 18 and 20 in order to reinforce the skin members. Each beam is preferably composed of a three-ply fiberglass member which is generally channel-shaped as at 41 and provided with lateral extensions 42 on opposite sides which are inserted into elongated slots formed by interruptions in the inner skin member 28 and adhered to shallow pockets 44 which are formed by opposed confronting edges of the skin member 28. Although not illustrated, corresponding beams may be formed in the roof section 14 as well as the front and rear sections 12 and 16. Preferably, the beam members 40 as described traverse the entire vertical extent of the side sections 18 and 20.

The floor section 22 is anchored to the chassis C through subframe members 48 which extend longitudinally of the vehicle and have upper edges clamped to the underside of the floor section by tie-down bolts 50 which when tightened urge body fixing clamps 52 upwardly against the upper ends of the subframe members 48. The subframes 48 are rigidly attached to main channel frames 54 of the chassis by tie-down straps 55 which are welded to the subframe and bolted to the channel members 54. The floor section 22 is suitably made up of an upper horizontally extending fiberglass panel 56, and upper and lower spaced plywood panels 57 and 58, respectively, are sandwiched together by wooden beam members 59 extending longitudinally along opposite sides of the floor section and crossbeams 60 extending transversely at spaced intervals between the beams 59. This sandwich structure is adhered together into a unitary floor section and the upper panel 56 is united to the side sections 18 and 20 by bonding to inward horizontal extensions or skirts 28' of the inner skins 28 of the side sections; also, the beams 59 are adhered or bonded at their outer edges to the inner surfaces of the skins 28. In a corresponding manner, the floor section 22 is united to inner surfaces of the front and rear sections 12 and 16.

The top or roof section 14 has inner and outer skin members 28 and 29 as described and shown in FIGS. 5 and 6 for the side sections 18 and 20 but, as noted earlier, is formed with an elongated shallow depressed area or compartment 25 along the intermediate portion of the roof section to accommodate the air conditioning unit S. The air conditioning unit may be one of any number of conventional low-profile, commercially available systems, such as, the Suetrak Model AC31, manufactured and sold by Suetrak U.S.A., Inc. of Lamar, Colo. Although not specifically illustrated, the air conditioning unit S communicates with the air ducts 26 which extend longitudinally along opposite sides of the roof section directly above the window areas and communicate through openings or vents, not shown, with the interior of the bus. The compressors for the air conditioning system may be mounted either in the front or rear sections of the housing. Such a system is illustrated and described in more detail in Letters U.S. Pat. No. 4,607,497 assigned to the assignee of this invention.

Further, as illustrated in FIGS. 2, 3 and 4, suitable compartments provided with hinged doors 70 may be formed in the side and rear sections for storage of luggage and installation of equipment. For example, the compressor unit for the air conditioning system may be mounted within the rear section 16, and the door 72 would afford suitable access to the compressor unit.

It will be evident that the vehicle may be equipped with standard equipment and accessories, such as, seating, hand rails, interior luggage carriers in a well-known manner, and the same is true of the necessary electrical system for lighting, signage, etc. and may be appropriately installed as a part of the modular frame construction of the vehicle. Most important insofar as the present invention is concerned is the ability to construct the entire housing from lightweight but high strength moldable materials formed into modular sections which may be readily interconnected with a conventional chassis and combined to form a unitary housing. The lightweight, high strength sections will meet or exceed all load requirements or specifications but at the same time greatly reduce horsepower requirements for operation of the vehicle. In this connection, the housing as described is readily conformable for use in busses and other commercial transportation vehicles.

Although a preferred embodiment of the present invention has been hereinbefore set forth and described, it is to be understood that various modifications and changes may be made in the construction and arrangement of parts as well as composition of materials without departing from the spirit and scope of the present invention as defined by the appended claims.

I claim:

1. In a prefabricated vehicle provided with a chassis and ground-engaging wheels mounted on said chassis, the improvement comprising:

an elongated housing including modular front and rear sections, a modular roof section, and modular side sections on opposite sides of said housing, each said section having inner and outer substantially rigid plastic skin members in closely spaced parallel relation to one another and a light-weight filler material between said skin members, beam members projecting inwardly at spaced intervals to one another along said side sections, said side sections having peripheral edges in adjoining relation to one another, flanges being disposed along said adjoining peripheral edges of said sections, and means interconnecting said flanges together, said beam members being of generally channel-shaped configuration with an open end of each said beam member in abutting relation to an inner surface of said outer skin member, and securing means for securing each said beam member to an inner surface of said outer skin member; and a floor section rigidly mounted on said chassis, and attaching means for rigidly attaching said front and rear sections as well as said side sections to outer peripheral edges of said floor section.

2. In a prefabricated vehicle according to claim 1, said inner and outer skin members comprised of multiple plies of fiberglass material.

3. In a prefabricated vehicle according to claim 1, elongated slots formed in said inner skin member, each said beam member inserted in one of said slots, said inner skin member including facing edges on opposite sides of said slots secured to said beam member.

4. In a prefabricated vehicle according to claim 3, each said beam member having lateral extensions at its open end, and said facing edges of said inner skin member overlapping said lateral extensions of said beam member, each said beam member and inner skin member comprised of multiple plies of fiberglass and means for rigidly joining said lateral extensions of each said beam member to said facing edges.

5. In a prefabricated vehicle according to claim 1, said roof section having longitudinally extending air ducts along opposite sides thereof, and an air conditioning unit positioned in an elongated shallow cavity formed in said roof section, said roof section having an upper skin member with said cavity formed beneath said upper skin member, and a removable compartment supporting said air conditioning unit in said cavity beneath said upper skin member.

6. In a prefabricated vehicle according to claim 1, said front, rear and side sections having window openings therein, and at least one of said side sections having a door opening therein.

7. In a prefabricated vehicle according to claim 1, wherein said chassis includes upwardly extending frame members, said floor section having upper and lower spaced panels and beam members therebetween, and said attaching means includes downwardly extending frame members rigidly attached to said frame members of said chassis and inward horizontal extensions of said inner skin member of said side sections attached to said floor section.

8. In a prefabricated vehicle provided with a chassis and ground-engaging wheels mounted on said chassis, the improvement comprising:

an elongated housing including modular front and rear sections, a modular roof section, and modular side sections on opposite sides of said housing, each said section having inner and outer rigid plastic skin members in closely spaced parallel relation to one another and a lightweight filler material between said skin members, and means interconnecting said modular sections together, said inner and outer skin members comprised of multiple plies of fiberglass material, and beam members being of generally channel-shaped configuration with an open end of each said beam member in abutting relation to an inner surface of said outer skin member along inner surfaces of said outer skin members; and said roof section having longitudinally extending air ducts along opposite sides thereof, and an air conditioning unit positioned in an elongated shallow cavity formed in said roof section.

9. In a prefabricated vehicle according to claim 8, each said beam member inserted in one of said slots, said inner skin member including facing edges on opposite sides of said slots secured to said beam member.

10. In a prefabricated vehicle according to claim 9, each said beam member having lateral extensions at its open end, and said facing edges of said inner skin member overlapping said lateral extensions of said beam member, each said beam member and inner skin member composed of multiple plies of fiberglass and means for rigidly joining said overlapping edges of said skin member to said lateral extensions of each said beam member.

11. In a prefabricated vehicle according to claim 8, said roof section having an upper skin member with said cavity formed beneath said upper skin member, and a removable compartment supporting said air conditioning unit in said cavity beneath said upper skin member.

* * * * *